US006192905B1

United States Patent
Mincy et al.

(10) Patent No.: US 6,192,905 B1
(45) Date of Patent: Feb. 27, 2001

(54) SCISSOR JET CLEANING DEVICE WITH HOSE MANAGEMENT SYSTEM

(75) Inventors: John Wade Mincy; John Wayne Mincy, both of Mobile, AL (US)

(73) Assignee: John W. Mincy, Mobile, AL (US)

( * ) Notice: Subject to any disclaimer, the term of this patent is extended or adjusted under 35 U.S.C. 154(b) by 0 days.

(21) Appl. No.: 09/325,807

(22) Filed: Jun. 4, 1999

(51) Int. Cl.[7] ............................... B08B 3/02; B08B 9/093
(52) U.S. Cl. ..................... 134/167 R; 239/227; 239/265
(58) Field of Search ........................... 134/167 R, 168 R; 118/306, 317; 239/227, 261, 265

(56) References Cited

U.S. PATENT DOCUMENTS

| 4,163,455 | 8/1979 | Hebert et al. | 134/167 R |
| 4,428,985 | 1/1984 | Bertolazzi | 118/306 X |
| 5,107,879 | 4/1992 | Harvey | 134/167 R |
| 5,352,298 | 10/1994 | Moulder | 134/168 R X |
| 5,392,798 | 2/1995 | Hirose et al. | 134/167 R |
| 5,518,553 | 5/1996 | Moulder | 134/167 R X |
| 5,638,845 | 6/1997 | Oliver et al. | 134/167 R |

*Primary Examiner*—Philip R. Coe
(74) *Attorney, Agent, or Firm*—Michael Kroll (57) ABSTRACT

The present invention 10 discloses an improved device for cleaning the inside of vessels 12 which could include truck tankers or rail car tankers. The present invention discloses a generally vertically standing rotatable support member 24 having mounted thereon a parallel pair of lazy tong assemblies or configurations 22 being a series of jointed and pivoted bars or arms, e.g., 28, capable of being extended over a great distance. Mounted on the distal end of the lazy tong assembly 22 is a spray head 32 having multiple spray outlets 42 and being fluidly connected to a supply of cleaning liquid 18 located on the outside of the vessel 12 which is being cleaned. The fluid connecting means comprises a hose 16, 46 along with connecting members being either a rod or a milled shaft 52 having a pair of pivotal centrally located collars 54 having connection means 50 for a hose on each collar 54 and a conduit 68 within the milled shaft 52 creating a passageway between the collars 54 forming a fluid connection from one collar to the next and the spray head 32.

14 Claims, 7 Drawing Sheets

SCISSOR JET CLEANING DEVICE WITH HOSE MANAGEMENT SYSTEM

BACKGROUND OF THE INVENTION

1. Field of the Invention

The present invention relates generally to internal extendable devices and, more specifically, to a device which connects to any vessel having an access cover with fasteners wherein said device comprises a cover which is fastened over the vessel access port thereby sealing said access port and wherein said cover has rotatable means for connecting an external hose to a hose management system consisting of one or more scissor-like device(s) composed of a plurality of connected paired members each paired member being pivotally connected at their midpoints and having an oppositely opposed paired member whereby each paired member is connected at each distal end to another paired member and to the oppositely opposed paired member by a connecting member. Said connecting member being either a rod or a milled shaft having pivotal centrally located collars having connection means for a hose on each collar and a conduit within the milled shaft creating a passageway between the collars for the transference of a fluid from one collar to the next.

The present invention comprises a lazy tong assembly which includes a plurality of jointed extendable arms or bars that are disposed between a vertically standing support member and a spray head. The lazy tong assembly is a paired assembly with the tong arms connected intermediately by pivoting means further having the individual arm members pivotally connected at their ends. Each arm has a closely positioned matching parallel arm connected by pivoting means to form a parallel paired assembly.

Each paired member consists of a first member and a second member constructed of a length of round or bar stock, preferably bar stock. The first paired member and its oppositely opposed paired member form a segment in the scissor-like device. The first segment of said device is connected at one distal end to a shaft having means for increasing or decreasing the distance between the distal ends of the first and second members. The other distal ends of said first segment has connection means consisting of bar stock or milled stock. For the purposes of this description the oppositely opposed distal ends of the first and second members of the first segment will be assigned a specific connecting member but it is to be understood that they could be reversed.

The first member of the first segment has an oppositely opposed first member. Both are connected to distal ends of a shaft whereupon the oppositely opposed first members of the second segment are also attached. Said shaft acting as connection means between segments, a bearing for pivotal movement and as a spacer between the oppositely opposed first members.

The second member of the first segment has an oppositely opposed second member. Both are connected to distal ends of a milled shaft whereupon the oppositely opposed second members of the second segment are also attached. Said milled shaft acting as connection means between segments, a bearing for pivotal movement and as a spacer between the oppositely opposed second members. Said milled shaft further having two independent centrally located collars each having connection means for attaching a hose thereto and said milled shaft having a conduit within said shaft between the collars providing means for fluid transference from one collar to the other.

The scissor-like device is comprised of a plurality of segments having consistent connection means between the segments, oppositely opposed first members being attached to distal ends of a shaft acting as a bearing, a spacer and as connection means for the next segments first members, and oppositely opposed second members being attached to distal ends of a milled shaft acting as a bearing, a spacer, and as connection means for the next segments second members. Further said milled shaft having centrally located collars having means for connecting a hose. One collar acting as the hose terminus point for the segment and the other collar acting as the source for the hose connection of the next segment until at the terminus of the scissor-like device the first and second members converge to a milled shaft having one collar serving as the terminus of the hose connections and the other collar serving as the connection means for a device having one or more nozzles.

2. Description of the Prior Art

There are other extendable spraying apparatus designed for the cleaning and coating of large vessels such as railroad tanker cars and ship holds. Typical of these is U.S. Pat. No. 4,163,455 issued to Herbert et al. on Aug. 7, 1979.

Another patent was issued to Bertolazzi on Jan. 31, 1984 as U.S. Pat. No. 4,428,985. Yet another U.S. Pat. No. 5,107,879 was issued to Harvey on Apr. 28, 1992 and still yet another was issued on Oct. 4, 1994 to Moulder as U.S. Pat. No. 5,352,298. Another patent was issued to Hirose on Feb. 28, 1995 as U.S. Pat. No. 5,392,798. Yet another U.S. Pat. No. 5,518,553 was issued to Moulder on May 21, 1996 and still yet another was issued on Jun. 17, 1997 to Oliver et al. as U.S. Pat. No. 5,638,845.

The present invention is an improvement over the prior art as disclosed in U.S. Pat. No. 5,638,845 of which one of the co-applicants was a co-inventor.

U.S. Pat. No. 4,163,455

Inventor: Chris J. Herhert et al.

Issued: Aug. 7, 1979

An apparatus for cleaning cargo or tanker holds of ships is provided having a central support axle extending from the hold floor to the ship deck and on which is a trolley assembly having adjustable spray nozzles which trolley can travel vertically, as well as, rotationally about the support axle.

U.S. Pat. No. 4,428,985

Inventor: Luciano F. Bertolazzi

Issued: Jan. 31, 1984

A method of applying a coating to the inside surface of a double-curved shell circular in horizontal section. Apparatus having a work platform for coating equipment is positioned in the shell. The work platform is displaceable on extendable and retractable legs so that it can move vertically and horizontally so as to be positioned adjacent the shell. As the apparatus is rotated about its vertical axis a coating is applied from the work platform to the shell surface as a horizontal band extending circumferentially around the shell surface. By extending or retracting the legs, the work platform can be positioned adjacent an area of the shell surface which has not been coated and that area coated as described.

U.S. Pat. No. 5,107,879

Inventor: Charles D. Harvey

Issued: Apr. 28, 1992

Tank car cleaning apparatus mountable on a tank car hatch and movable within the car to clean its interior, the apparatus includes a rotatable mast with a movable arm connected thereto having a high pressure liquid nozzle mounted at its end for applying liquid under pressure to the car's interior to clean it, the arm movable from outside the car into its interior, and in one aspect, the nozzle itself articulable through an arc.

U.S. Pat. No. 5,352,298

Inventor: Jeffrey E. Moulder

Issued: Oct. 4, 1994

An improved apparatus and method for cleaning and stripping residue, contaminants, debris, etc. from all of the interior spaces in a railway tank car and the like. The present invention may be conventionally lowered into a tank car through its manway and, after quick assembly thereof, pneumatically configured to accommodate the physical dimensions of the tank car, and then be preset for automatic cleaning and/or stripping operation. A means is provided which inherently coordinates and synchronizes the cleaning and stripping of virtually every internal surface contained in a tank car. The preferred embodiment comprises a X-frame assembly having a pair of corresponding X-members which are attached by an axle disposed therebetween. Pivotally attached to this X-frame assembly is a swivel support assembly which receives a K-frame assembly comprising a plurality of arm means, linkage means and spray means spraying all of the interior surfaces of a tank car.

U.S. Pat. No. 5,392,798

Inventor: Susumi Hirose et al.

Issued: Feb. 28, 1995

A pair of expansion links each having a rotary jet nozzle are respectively expanded in the opposite two directions in synchronism with each other within a tank. With these link mechanisms capable of expansion and contraction, the link arms forming the links can be closed until the link arms are parallely adjoined to one another. The link mechanisms are driven by a driving shaft from outside the tank. The inner surface of the tank is scanned with streams of water sprayed from the nozzles along with the expansion of the expansion links thereby cleaning the inner surface of the tank.

U.S. Pat. No. 5,518,553

Inventor: Jeffrey E. Moulder

Issued: May 21, 1996

An improved apparatus and method for cleaning and stripping residue, contaminants, and debris from all of the interior surfaces in a storage tank and the like. The present invention may be conveniently inserted into a tank through its manway and after quick assembly thereof, hydraulically positioned vertically and then maneuvered and articulated to clean and strip interior storage tank surfaces. A means is provided which inherently coordinates and synchronizes hydraulically driven rotation of the vertical pole on the tank floor with the hydraulically driven rotation of a spray bar disposed at the remote end of a boon assembly. Close proximity of the spray to the surfaces is controlled by hydraulically operated cylinders contained on a rotor assembly.

U.S. Pat. No. 5,638,845

Inventors: Michael A. Oliver et al.

J. Wade Mincy

Issued: Jun. 17, 1997

A scissor jet cleaning device (10) for cleaning the interior of a tank(12) through a dome (14) on the tank (12) of a tanker (16). The device (10) comprises a support arm (18) that is adjustable in length. An assembly (20) is mounted to the dome (14) and is connected to a first side of the support arm (18), for extending and retracting the support arm (18) within the tank (12). A double spray nozzle head (22) is mounted in a rotatable manner to a second side of the support arm (18). A facility (24) is for fluidly connecting the double spray nozzle head (22) to pressurized cleaning fluid, so as to clean the interior of the tank (12). a structure (26) is connected to the extending and retracting assembly (20), for rotating the support arm (18) in its retracted position 180 degrees, so that the double spray nozzle head (22) can clean the interior of the tank (12) in an opposite direction.

While these internal extendable devices may be suitable for the purposes for which they were designed, they would not be as suitable for the purposes of the present invention, as hereinafter described.

SUMMARY OF THE PRESENT INVENTION

The present invention discloses an improved device for cleaning the inside of vessels which could include truck tankers or rail car tankers. The present invention discloses a generally vertically standing rotatable support member having mounted thereon a parallel pair of lazy tong assemblies or configurations being a series of jointed and pivoted bars or arms capable of being extended over a great distance. Mounted on the distal end of the lazy tong assembly is a spray head having multiple spray outlets and being fluidly connected to a supply of cleaning liquid located on the outside of the vessel which is being cleaned. The fluid connecting means comprises a hose along with connecting members being either a rod or a milled shaft having, a pair of pivotal centrally located collars having connection means for a hose on each collar and a conduit within the milled shaft creating a passageway between the collars forming a fluid connection from one collar to the next and the spray head.

A primary object of the present invention is to provide a device which seals to a vessel having an access port wherein said device has a cover having rotatable means for connecting an external hose and rotatable connection means for manipulating a hose management system comprising one or more extendable and retractable scissor device(s) having the hose forming an integral part of the extendable members of the device.

Another object of the present invention is to provide a device which seals to a vessel having an access port wherein said device has a cover having rotatable means for connecting an external hose and rotatable connection means for manipulating a hose management system comprising one or more extendable and retractable scissor device(s) having the hose forming an integral part of the extendable members of the device thereby eliminating the need for extending and retracting the hose during the cleaning process.

Yet another object of the present invention is to provide a device which seals to a vessel having an access port wherein said device has a cover having rotatable means for connecting an external hose and rotatable connection means for manipulating a hose management system comprising one or more extendable and retractable scissor device(s) having the hose forming an integral part of the extendable members of the device thereby eliminating the possibility of the hose becoming entangled in the cleaning device.

Additional objects of the present invention will appear as the description proceeds.

The present invention overcomes the shortcomings of the prior art by providing a device which connects to any vessel having an access cover with fasteners wherein said device comprises an access port sealing cover which is fastened over the vessel access port thereby sealing said access port and wherein said cover has rotatable connection means for attaching an external hose and rotatable control means for extending and retracting an internal hose management system consisting of one or more scissor-like device(s) composed of a plurality of segments wherein each segment has means for connecting a fluid transference conduit forming an integral part of each segment thereby selectively allowing a plurality of segments to be joined to fit the job and eliminating the possibility of the hose becoming entangled in the apparatus and further eliminating the need for extending and retracting the hose during the process.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

LIST OF REFERENCE NUMERALS

With regard to the reference numerals used, the following numbering is used throughout the drawings.

10 present invention
12 vessel
14 access port
16 external hose
18 fluid
20 access port cover
22 tong assembly
24 vertical support member
26 internal extension means
28 tong arm
29 tong arm
30 tong arm
31 tong arm
32 spray head
34 parallel tong arm
36 intermediate pivot means
38 pivot means
40 hydraulic pivot means
41 fluid connecting means
42 spray nozzle
43 handle 44 rotatable means
45 external extension means
46 internal hose
48 hose connecting means
50 hose connecting means
52 milled shaft
54 collars
56 cavity
58 aperture
60 O-rings
62 raised central portion
64 o-ring groove
66 friction washer
68 conduit
70 distal arms
72 spray head hose connecting means
74 spray head connecting means

DESCRIPTION OF THE PREFERRED EMBODIMENT(S)

Turning now descriptively to the drawings, in which similar reference characters denote similar elements throughout the several views, FIGS. 1 through 7 illustrate the present invention being a device for cleaning the inside of vessels.

Figure 1:
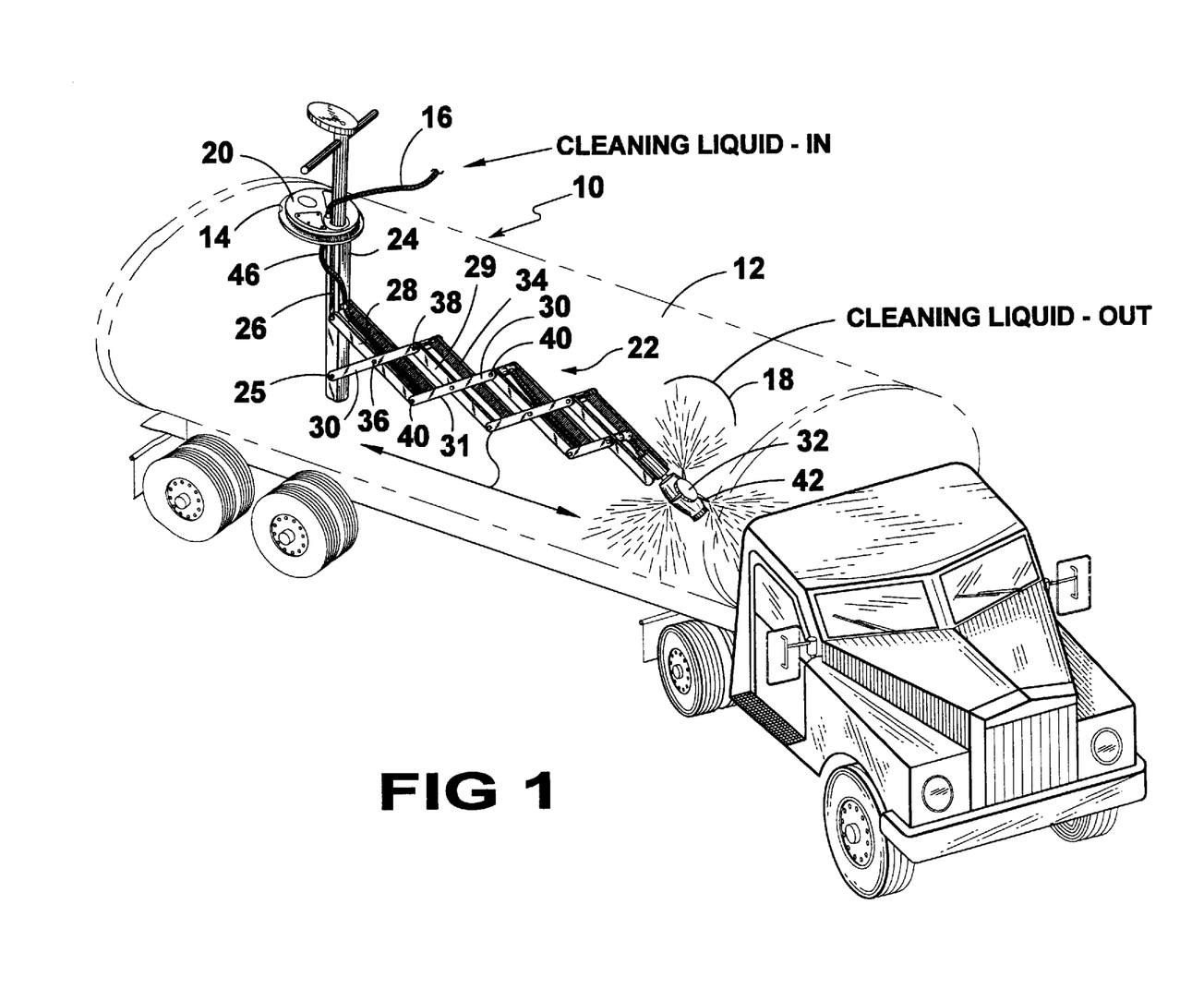
FIG. 1 is a perspective view of one application of the preferred embodiment of the present invention wherein a tanker truck has the device attached to its access port and has a rigid external hose providing a high pressure stream of fluid from an external source connected to the rotatable hose connection means and wherein said device being rotatable and having extendable and retractable segments having fluid transference conduit being an integral part of each segment terminating in a device having one or more nozzles is able to deliver said high pressure fluid to all internal surfaces of the tank.

Turning to FIG. 1, therein is shown a perspective view of one application of the preferred embodiment of the present invention generally shown at 10 wherein a tanker truck vessel 12 has the present invention 10 attached internally to its access port 14 having a semi-rigid external hose 16 providing a high-pressure stream of fluid 18 from an external source (not shown) connected to the access port cover 20 and thereafter the hose 46 running through the parallel pair of lazy tong assemblies generally shown at 22 as will be described hereinafter. The lazy tong assembly 22 is mounted on a generally vertically standing support member 24 having elongated rod-like means 26 for vertically moving the first arm or bar 28 of the tong assembly in order to cause the entire lazy tong assembly to be either extended or retracted. Means 26 is connected by pivot means 25 to member 28. The lazy tong assembly 22 includes a plurality of jointed extendable arms or bars, e.g., 28, 29, 30 and 31 and others which are unnumbered, that are disposed between the vertically standing support member 24 and the spray head 32. Note that the lazy tong assembly is a paired assembly with the tong arms, e.g., 28, 29, 30, and 31 connected intermediately by pivoting means 36 further having the individual arm members pivotally connected at the ends 38 and 40. Each arm, e.g., 29, has a closely positioned matching parallel arm, e.g., 34, connected by pivoting means 36, 38 and 40 to form a parallel paired assembly 22. Means 40 is a fluid connecting means being rotatable and has fluid conveyance conduits within being an integral part of each segment. The lazy tong assembly 22 terminates in a spray head device 32 having one or more nozzles 42 which is able to deliver high-pressure fluid 18 to all internal surfaces of the tank or vessel.

Figure 2:
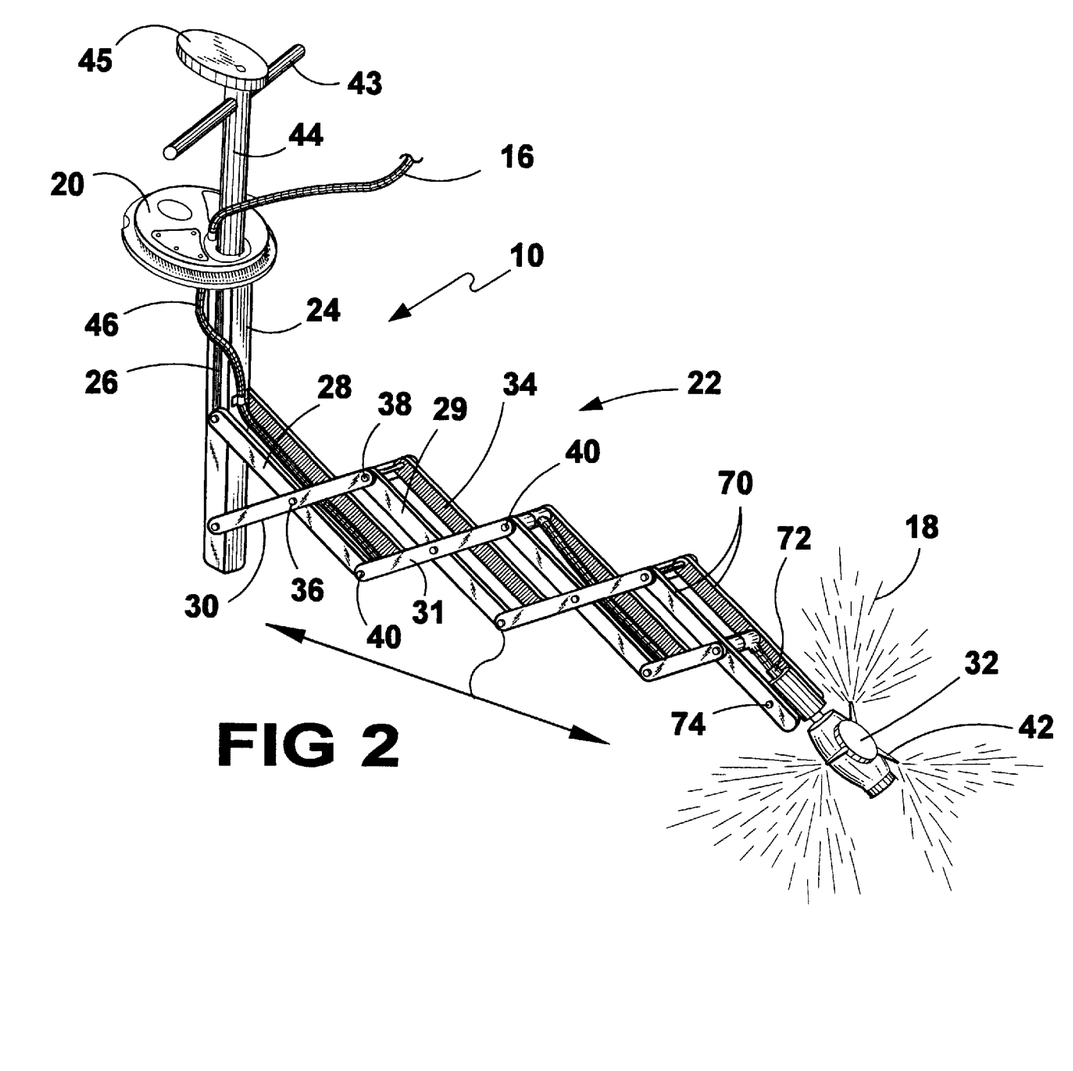
FIG. 2 is an enlarged view of the preferred embodiment of the present invention. Shown is a device which connects to any vessel having an access cover with fasteners wherein said device comprises a cover which is fastened over the vessel access port thereby sealing said access port and wherein said cover has rotatable means for connecting an external hose to an internal hose management system consisting of one or more scissor-like device(s) having fluid transference fittings and conduit for delivering a continuous supply of fluid to a terminus device having one or more nozzles for dispersing said fluid over all of the internal surfaces and having external means for rotating the device while in the tank, as well as, external means for extending and retracting the scissor-like segments in concert.

Turning to FIG. 2, therein is shown an enlarged view of the preferred embodiment of the present invention 10. Shown therein is a device being the present invention 10 which can be connected to any vessel having an access port and access cover 20 with fastening means to the vessel (not shown) wherein the present invention comprises a cover 20 which is fastened over the vessel access port (not shown) thereby sealing the access port. The cover 20 is further equipped with rotatable means 44 with handle 43 for rotably moving the tong assembly 22. Also shown is an external hose 16 which is connected to an internal hose 46 being an internal hose management system consisting of a pair of scissor-like devices being the lazy tong assemblies having fluid transfer fittings 40 having conduits therein for delivering a continuous supply of fluid 18 to a spray head 32 having nozzles 42 for dispersing fluid 18 over all of the internal surfaces of the vessel and having an external means 44 for rotating the device 22 180 degrees while in its retracted position while in the tank 12. The device also has external means 45 communicating with rod means 26 for extending and retracting the lazy tong assembly having the scissor-like segments therein. The lazy tong assembly 22 includes a plurality of jointed extendible arms or bars, e.g., 28, 29, 30 and 31 and others which are unnumbered, that are disposed between the vertically standing support member 24 and the spray head 32. Note that the lazy tong assembly is a paired assembly with the tong arms, e.g., 28, 29, 30, and 31 connected intermediately by pivoting means 36 further having the individual members pivotally connected at the ends 38 and 40. Each arm, e.g., 29, has a parallel arm, e.g., 34, connected by pivoting means 36, 38 and 40 to form a parallel paired assembly 22. Means 40 is a fluid connecting means being rotatable and has fluid conveyance conduits within being an integral part of each segment terminating in a spray head device 32 having one or more nozzles 42 which is able to deliver high-pressure fluid 18 to all internal surfaces of the tank or vessel. Spray head 32 has means for connection 74 to the distal pair of arms 70.

Figure 3:
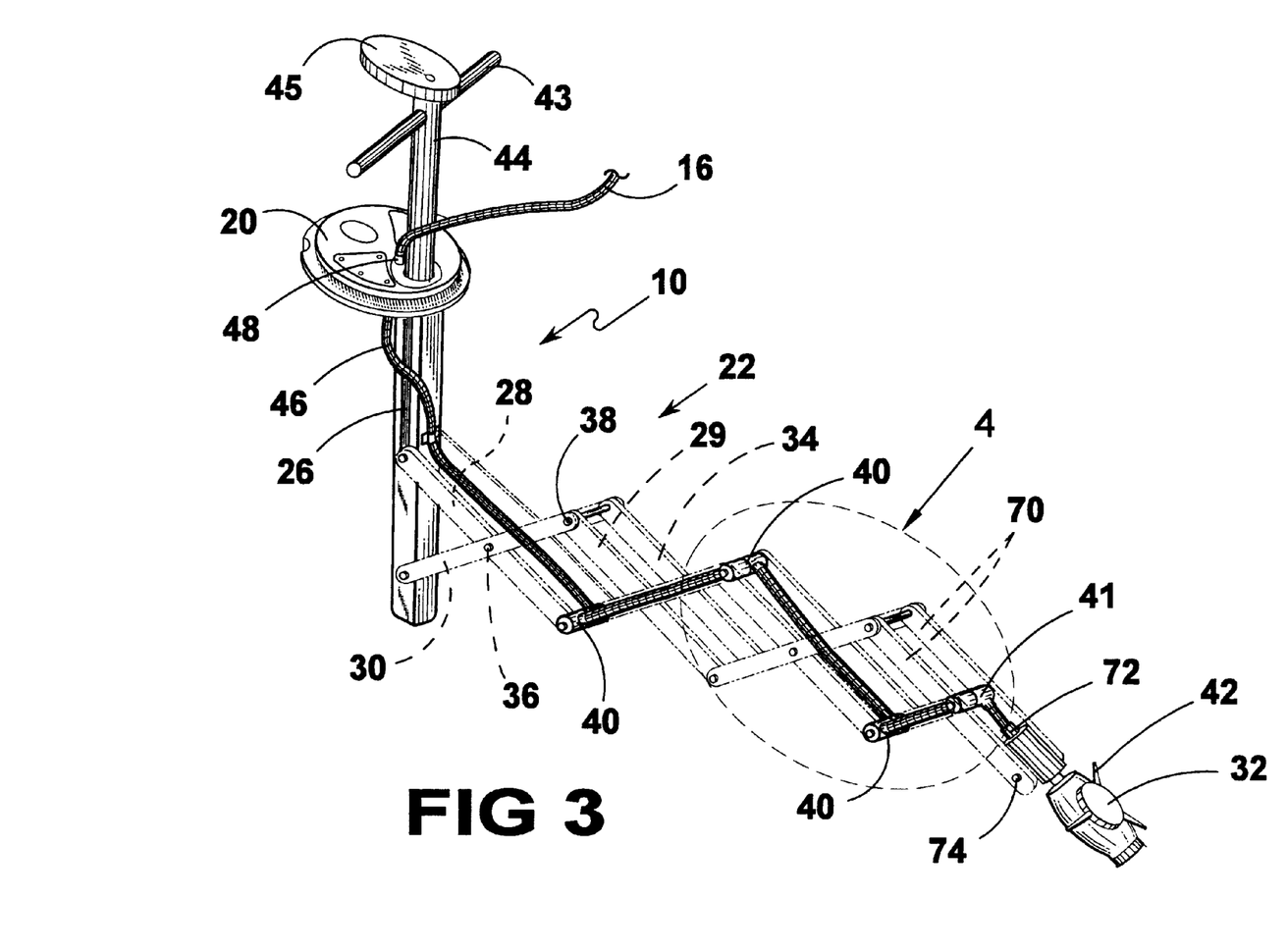
FIG. 3 is an enlarged view of the preferred embodiment of the present invention. Shown is a scissor jet cleaning device having external means for rotating the device while in the tank, as well as, external means for extending and retracting the scissor-like segments in concert and external continuous fluid connection means. Also shown are a plurality of extendable retractable segments, shown in outline, having fluid transference fittings and conduit for delivering a continuous supply of cleaning fluid to the terminus device having one or more nozzles for dispersing said cleaning fluid over the surfaces to be cleaned.

Turning to FIG. 3, therein is shown an enlarged view of the preferred embodiment of the present invention 10. Shown is the lazy tong assembly generally at 22 having external means for rotating 44 while in the tank as well as external means 45 for being extended and retracted. Also shown is the external hose 16 being connected with the internal hose 46 with connecting means 48. Also shown are a plurality of the extendible retractable segments 28, 29, 30, and 34 shown in outline, having pivot or hinge means 36, 38 and pivot means and fluid transfer fittings and conduits 40 for delivering a continuous supply of cleaning fluid to the terminal nozzle head 32 having one or more nozzles 42 thereon for dispersing the cleaning fluid 18 over the surfaces to be cleaned. Note that the fluidly connecting means 41 nearest the spray head 32 is connected intermediately on the arm pair 70 so as to be positioned for being connected by means 72 to the spray head 32 which is connected by means 74 to the end of arm pair 70.

Figure 4:
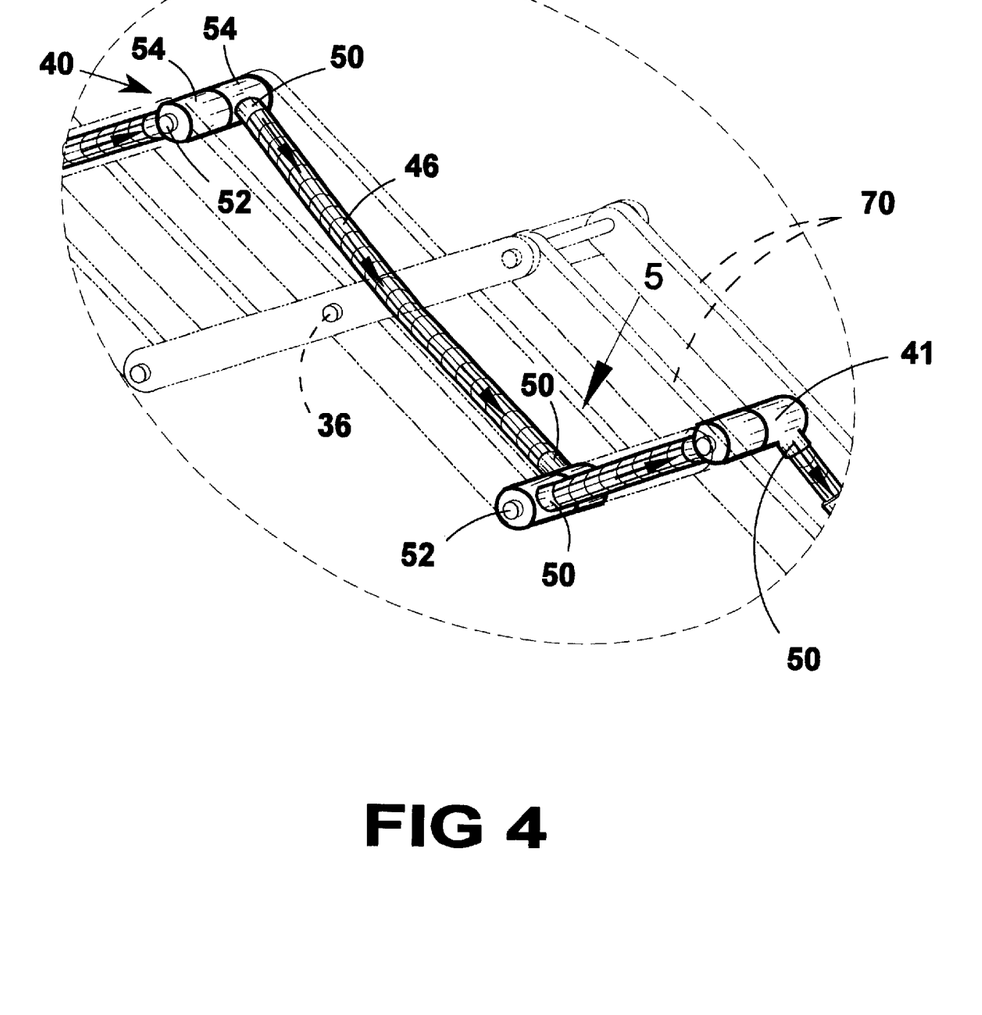
FIG. 4 is an enlarged view of one of the scissor-like segments having a first and second member being pivotally connected at their midpoints and having an oppositely opposed paired member wherein the oppositely opposed first members are attached to distal ends of a shaft acting as a bearing, a spacer and as connection means for the next segments first members, and oppositely opposed second members being attached to distal ends of a milled shaft acting as a bearing, a spacer, and as connection means for the next segments second members and said milled shaft having centrally located collars having means for connecting a hose. One collar acting as the hose terminus point for the segment and the other collar acting as the source for the hose connection of the next segment.

Turning to FIG. 4, therein is shown an enlarged view of one of the scissor-like segments having its members pivotally connected intermediately at 36. Connecting member 40 is either a rod or milled shaft 52 having a pair of pivotally centrally located collars 54 having inlet and outlet connection means 50 for a hose 46 on each collar and a conduit (not visible) within the milled shaft creating a passage-way between the collars for the transfer of fluid from one collar to the next.

Figure 5:
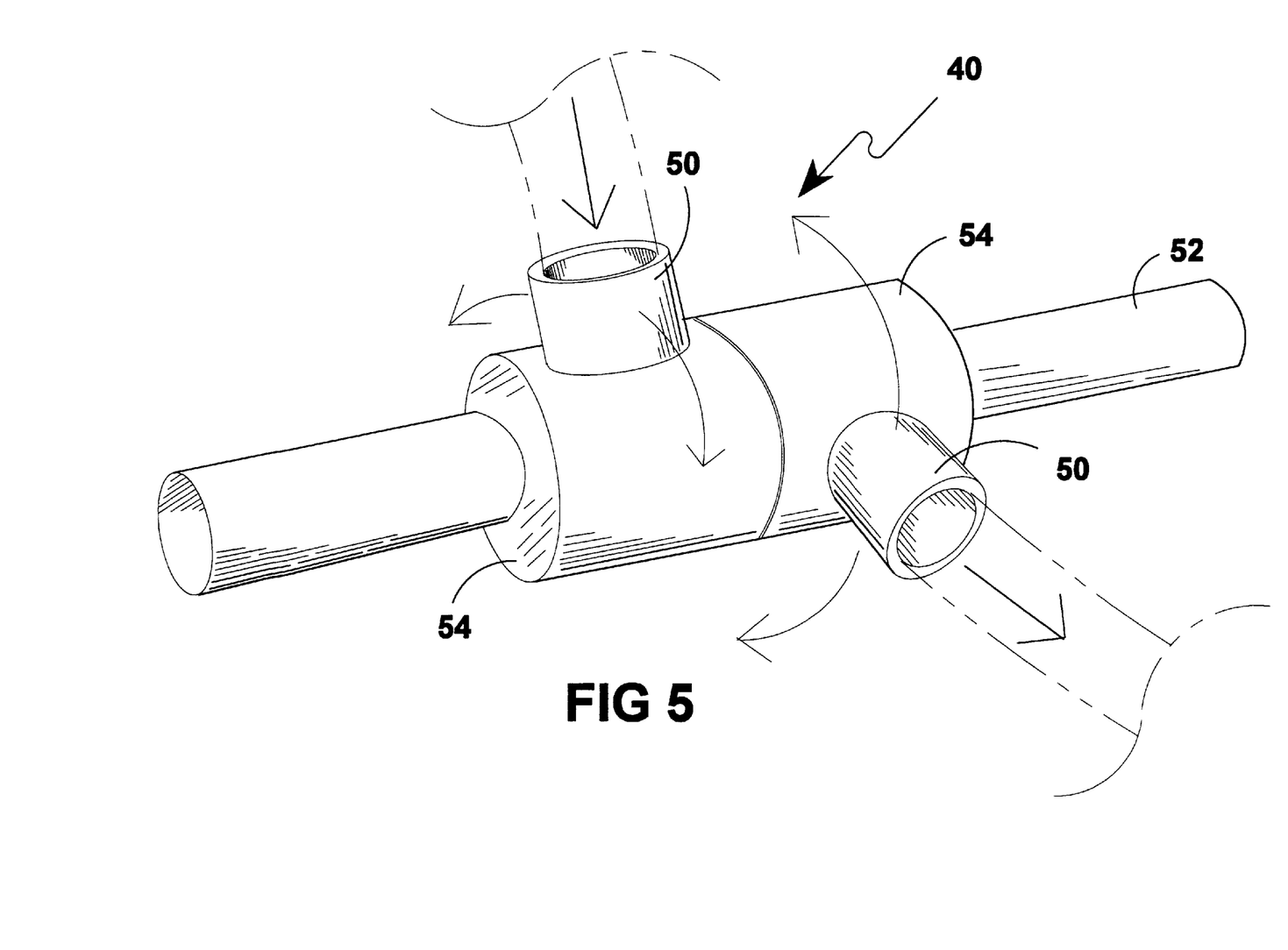
FIG. 5 is a perspective view of the milled shaft having centrally located collars providing means for connecting a fluid transference conduit thereto.

Turning to FIG. 5, therein is shown a perspective view of member 40 showing the milled shaft 52 having a pair of centrally located collars 54 which collars are rotatable having inlet and outlet hose connection means 50 which all together provide a means for creating a fluid transfer conduit therein. Fluid connection member 40 which also serves as a pivot or hinge means for the lazy tong assembly 22, integrates the hose conduit into the extendible members of the lazy tong configuration 22 and prevents the hose from becoming pinched or entangled in the lazy tong configuration 22 as it is extended or retracted.

Figure 6:
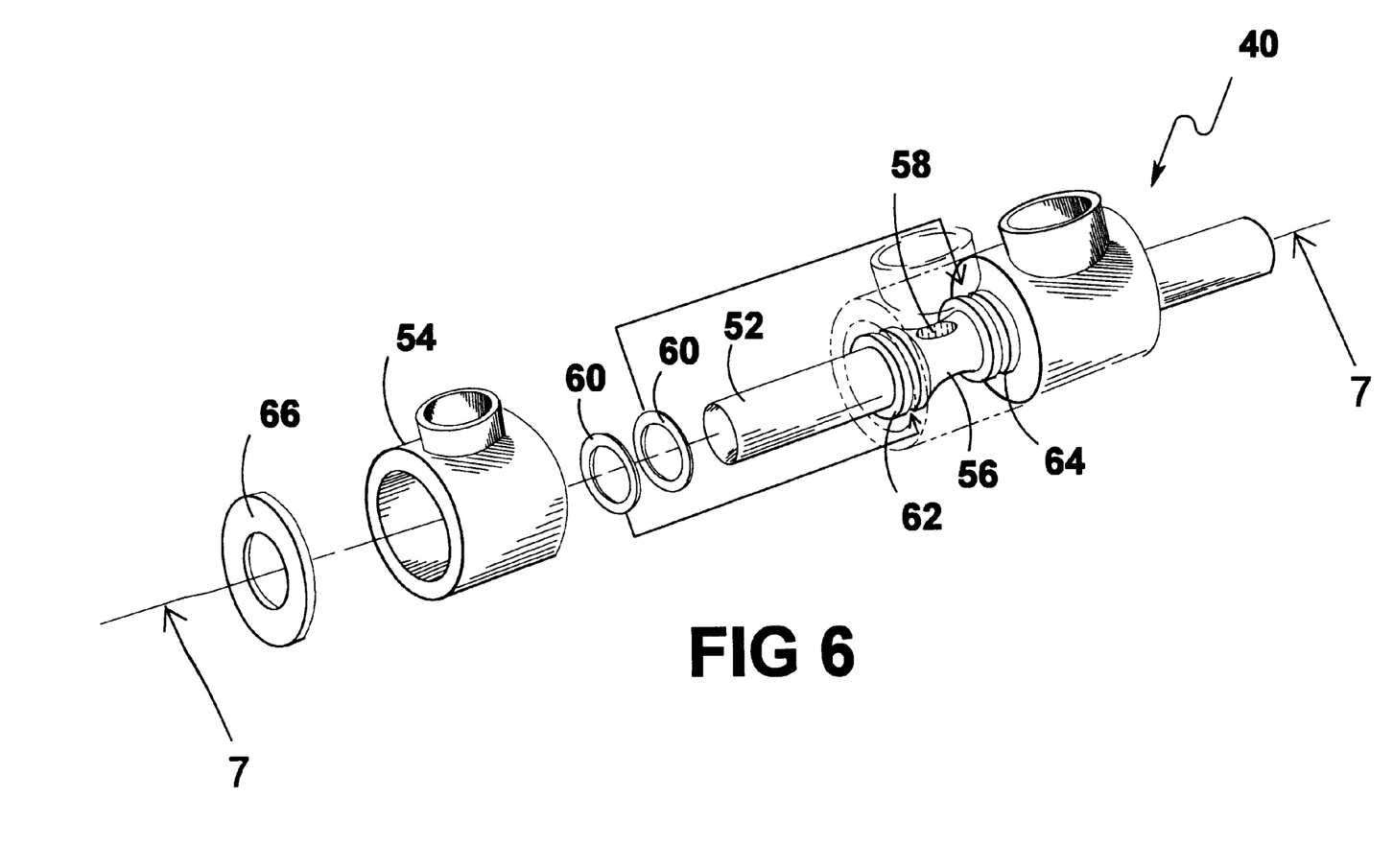
FIG. 6 is a partially exploded view of one of the collar members removed from the milled shaft. Shown is a milled shaft having a raised central portion having a milled central cavity having an aperture leading into a conduit providing fluid transference means between the collars. Also shown are two o-rings which are situated on the raised portion of the milled shaft thereby providing sealing means for the conduit. Also shown is a friction washer.

Turning to FIG. 6, therein is shown a partially exploded view of member 40 showing one of the collar members 54 removed from the milled shaft 52. Shown is a milled shaft 52 having a raised central portion 62 having a milled central cavity 56 having an aperture 58 leading into an internal conduit (not visible but see FIG. 7) providing fluid transfer means between the collars 54. Also shown are two O-rings 60 which mount on a grooved o-ring track or surface 64 on the raised portion 62 of the milled shaft 52 thereby providing fluid sealing means for the collars 54. Also shown is a metal, plastic or like friction washer 66 for placement on shaft 52 between the collar 54 and the arms of the lazy tong assembly (not shown).

Figure 7:
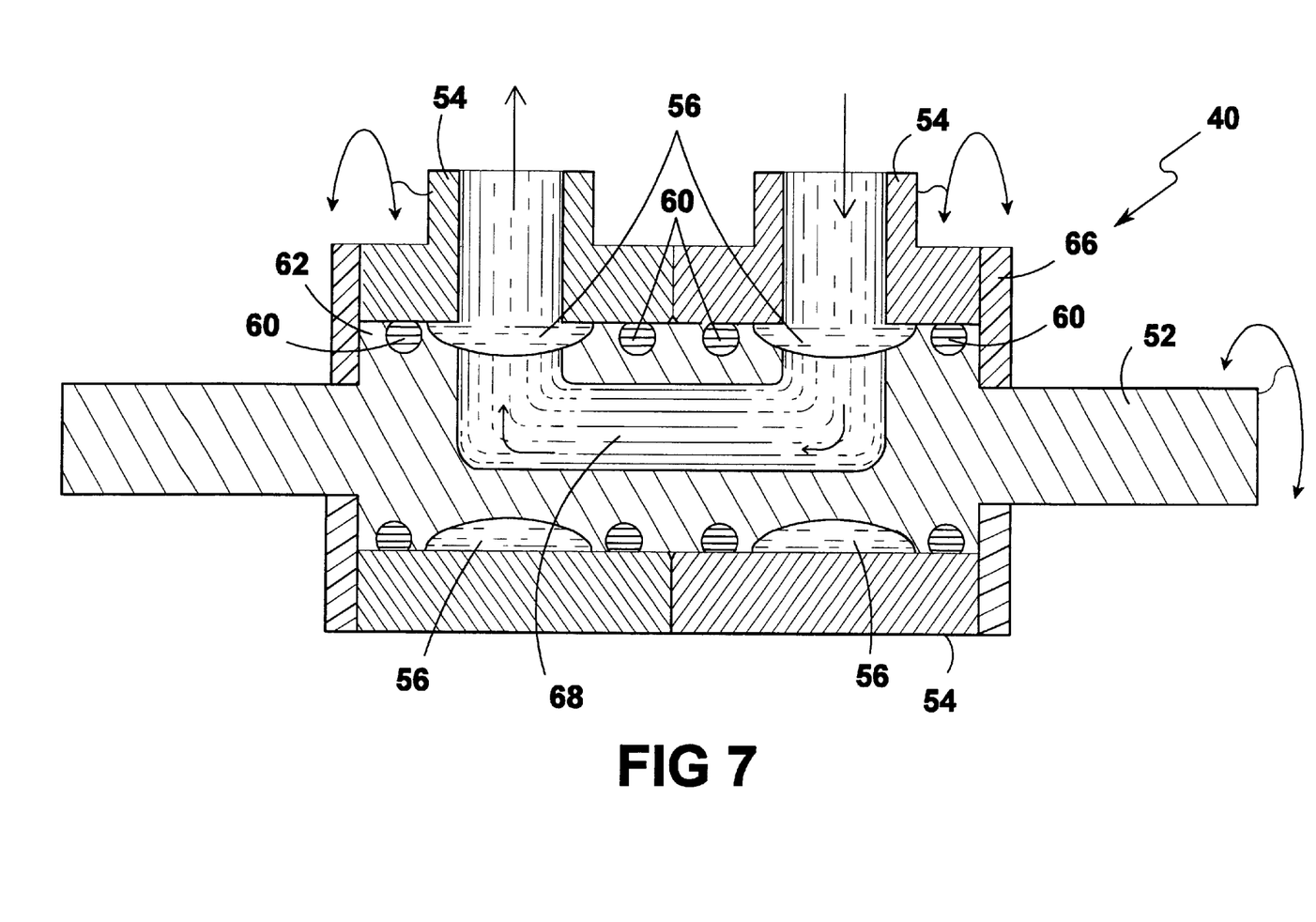
FIG. 7 is cross sectional view, taken from FIG. 6 as indicated, of the milled shaft and collars. Shown is a milled shaft having a raised central portion having a milled central cavity passing circumferentially around said raised portion thereby permitting a cavity for the fluid to travel into therein permitting the collar to be rotated without obstructing fluid flow. Also shown is a conduit within said milled shaft permitting fluid transference between the collars. Also shown is a set of o-rings located on each side of said central cavity providing sealing means between said milled shaft and said cavity.

Turning to FIG. 7, therein is shown a cross-sectional view, taken from FIG. 6 as indicated, of the member 40 showing the milled shaft 52 and collars 54. Shown is a milled shaft 52 having a raised central portion 62 having a milled central cavity 56 passing circumferentially around said milled shaft 52 thereby permitting a cavity 56 for the fluid to travel therein and permitting the collar 54 to be rotated without obstructing fluid flow. Also shown is a conduit 68 within said milled shaft permitting fluid transfer between the collars 54. Also shown is a set of O-rings 60 located on each side of said cavity 56 providing sealing means between the collars 54 and the cavity 56. Washer 66 is also shown.

What is claimed is:

1. An apparatus for cleaning the interior of vessels mounted on a vertical support member attached to the access port of the vessel, being a lazy tong configuration being rotatable, extendible and retractable, having a spray head mounted distally thereon, having a hose therein being part of a fluid conveyance system fluidly communicating with an external fluid supply and the spray head, the improvement comprising:
    a) a matched pair of lazy tong assemblies having a plurality of connected arms;
    b) a first means for hingedly connecting said pair of lazy tong assemblies to each other;
    c) a second means for hingedly connecting said pair of lazy tong assemblies to each other;
    d) said second means for hingedly connecting having a conduit therein for transferring fluid therethrough;
    e) a first means for connecting the hose to said second means for hingedly connecting; and,
    f) a second means for connecting the hose to the spray head distally positioned on said paired lazy tong assembly.

2. The apparatus of claim 1, said paired lazy tong assembly further comprising a plurality of pivotally connected arms.

3. The apparatus of claim 1, said first means for hingedly connecting said pair of lazy tong assemblies further comprises rods.

4. The apparatus of claim 1, said second means for hingedly connecting further comprises a milled shaft said milled shaft having a conduit therein said conduit having apertures therein whereby fluid can be transferred into and out of said conduit.

5. The apparatus of claim 4, further comprising a pair of collars, said collars rotatably mounted on said milled shaft, said collars having one said collar being a fluid inlet and a second said collar being a fluid outlet, said collars being fluidly connected to each other by said conduit in said milled shaft said fluid inlet and said fluid outlet being fluidly connected to each other.

6. The apparatus of claim 5, said collars further comprising O-rings for sealing said collars to said milled shaft whereby fluid will not escape therefrom.

7. An improved cleaning device for cleaning the interior of a vessel through a dome on the vessel, having a lazy tong configuration that is adjustable in length, having an elongated rod on the support member mounted to the dome and connected to a first end of the lazy tong configuration for extending and retracting the lazy tong configuration within the vessel, having a spray head mounted distally on the opposite end of the lazy tong configuration, having a hose for fluidly connecting the spray head to a source of pressurized cleaning fluid so as to clean the interior of the vessel, the lazy tong configuration being rotatable in its retracted position 180 degrees so that the spray head can clean the interior of the vessel in all directions, the lazy tong configuration including a plurality of jointed extendible bars that are disposed between the support member and the spray head, wherein the improvement comprises:
    a) a matched pair of lazy tong assemblies having a plurality of connected arms;
    b) a first means for hingedly connecting said pair of lazy tong assemblies to each other;
    c) a second means for hingedly connecting said pair of lazy tong assemblies to each other;
    d) said second means for hingedly connecting having a conduit therein for transferring fluid therethrough;
    e) a first means for connecting the hose to said second means for hingedly connecting; and,
    f) a second means for connecting the hose to the spray head distally positioned on said paired lazy tong assembly.

8. The apparatus of claim 7, said second means for hingedly connecting further comprises a milled shaft said milled shaft having a conduit therein said conduit having apertures therein whereby fluid can be transferred into and out of said conduit.

9. The apparatus of claim 8, further comprising a pair of collars, said collars rotatably mounted on said milled shaft, said collars having one said collar being a fluid inlet and a second said collar being a fluid outlet, said collars being fluidly connected to each other by said conduit in said milled shaft said fluid inlet and said fluid outlet being fluidly connected to each other.

10. The apparatus of claim 9, said collars further comprising O-rings for sealing said collars to said milled shaft whereby fluid will not escape therefrom.

11. An apparatus for cleaning the interior of a vessel through a dome on the vessel, comprising:
    a) a lazy tong assembly that is adjustable in length;
    b) means mounted to the dome and connected to a first end of said lazy tong assembly for extending and retracting said lazy tong assembly within the tank;
    c) a spray head mounted to a second distal end of said lazy tong assembly;
    d) means for fluidly connecting said spray head to pressurized cleaning fluid so as to clean the interior of said vessel;
    e) a hose being part of said means for fluidly connecting said spray head to pressurized cleaning fluid;
    f) means connected to said extending and retracting means for rotating said lazy tong assembly in its retracted position 180 degrees so that said spray head can clean the interior of said vessel in all directions;
    g) a matched pair of lazy tong assemblies having a plurality of connected arms;
    h) a first means for hingedly connecting said pair of lazy tong assemblies to each other whereby said pair of lazy tong assemblies are securely connected to each other;
    i) a second means for hingedly connecting said pair of lazy tong assemblies to each other;

j) said second means for hingedly connecting having a conduit therein for transferring fluid therethrough;
k) a first means for connecting said hose to said second means for hingedly connecting; and,
l) a second means for connecting said hose to said spray head distally positioned on said paired lazy tong assembly.

12. The apparatus of claim 11, said second means for hingedly connecting further comprises a milled shaft said milled shaft having a conduit therein said conduit having apertures therein whereby fluid can be transferred into and out of said conduit.

13. The apparatus of claim 12, further comprising a pair of collars, said collars rotatably mounted on said milled shaft, said collars having one said collar being a fluid inlet and a second said collar being a fluid outlet, said collars being fluidly connected to each other by said conduit in said milled shaft said fluid inlet and said fluid outlet being fluidly connected to each other.

14. The apparatus of claim 13, said collars further comprising O-rings for sealing said collars to said milled shaft whereby fluid will not escape therefrom.

* * * * *